(12) United States Patent
Vincent et al.

(10) Patent No.: US 10,538,263 B2
(45) Date of Patent: Jan. 21, 2020

(54) CONTROLLED ENERGY ABSORBING RAKE ADJUSTMENT LEVER

(71) Applicant: STEERING SOLUTIONS IP HOLDING CORPORATION, Saginaw, MI (US)

(72) Inventors: Matt Vincent, Saginaw, MI (US); Carl Seamon, Lothrop, MI (US); Doug Butterfield, Auburn, MI (US); Robert Dubay, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 16/010,690

(22) Filed: Jun. 18, 2018

(65) Prior Publication Data

US 2019/0382044 A1    Dec. 19, 2019

(51) Int. Cl.
*B62D 1/18* (2006.01)
*G05G 1/04* (2006.01)
*B62D 1/184* (2006.01)
*G05G 25/00* (2006.01)

(52) U.S. Cl.
CPC .............. *B62D 1/184* (2013.01); *G05G 1/04* (2013.01); *G05G 25/00* (2013.01)

(58) Field of Classification Search
CPC . B62D 1/184; G05G 1/04; G05G 1/06; G05G 1/30; G05G 1/32; G05G 1/323; G05G 1/327; G05G 25/00; F16H 59/0278; F16H 2059/0291
See application file for complete search history.

(56) References Cited

U.S. PATENT DOCUMENTS

| 6,082,216 A  * | 7/2000 | Watanabe ........... F16H 59/0278 74/473.3 |
| 7,000,497 B1 * | 2/2006 | Campbell ........... F16H 59/0278 74/525 |
| 7,396,183 B2 * | 7/2008 | Dona Contero .......... B60T 7/06 403/122 |
| 8,695,393 B2 * | 4/2014 | Burguera Albizuri ... B21D 9/01 72/370.01 |
| 9,323,280 B2 * | 4/2016 | Lee .......................... G05G 1/30 |
| 2005/0011300 A1 * | 1/2005 | Gates ..................... B62K 11/14 74/544 |
| 2007/0295148 A1 * | 12/2007 | Seim ....................... G05G 1/04 74/519 |

FOREIGN PATENT DOCUMENTS

DE  102014008464 A1 * 12/2015 .............. G05G 1/02
WO  WO-2014038286 A1 * 3/2014 ......... F16H 59/0278

* cited by examiner

*Primary Examiner* — Adam D Rogers

(57) ABSTRACT

A lever assembly includes a lever that extends between a first lever end and a second lever end and a lever member. The lever member has a lever member first portion connected to the second lever end and a lever member second portion extending from the lever member first portion. The lever member second portion has an intermediate portion defining a predefined plastically deformable stress point that is arranged to facilitate movement of the lever member second portion relative to the lever member first portion.

6 Claims, 1 Drawing Sheet

CONTROLLED ENERGY ABSORBING RAKE ADJUSTMENT LEVER

BACKGROUND

An adjustable steering column assembly may be provided with a mechanism that enables the steering column assembly to be adjusted along the steering column axis or about a pivot axis. The mechanism that enables adjustment generally employs a locking system to maintain a selected position of the adjustable steering column assembly relative to an operator of the vehicle. During a vehicle impact event, a knee of the operator of the vehicle may impact a portion of the mechanism.

SUMMARY

Disclosed is a lever assembly that is provided with a steering column. The lever assembly includes a lever and a lever member. The lever extends between a first lever end and a second lever end. The lever member has a lever member first portion connected to the second lever end and a lever member second portion extending from the lever member first portion. The lever member second portion has an intermediate portion defining a predefined plastically deformable stress point that is arranged to facilitate movement of the lever member second portion relative to the lever member first portion.

Also disclosed is a lever assembly provided with a steering column that includes a lever member. The lever member includes a lever member first portion and a lever member second portion extending from the lever member first portion. The lever member second portion has a first side and a second side. The first side and the second side each extending between a first end of the lever member second portion and a second end of the lever member second portion. The lever member second portion defines a first notch that extends from the first side towards the second side.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the invention that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
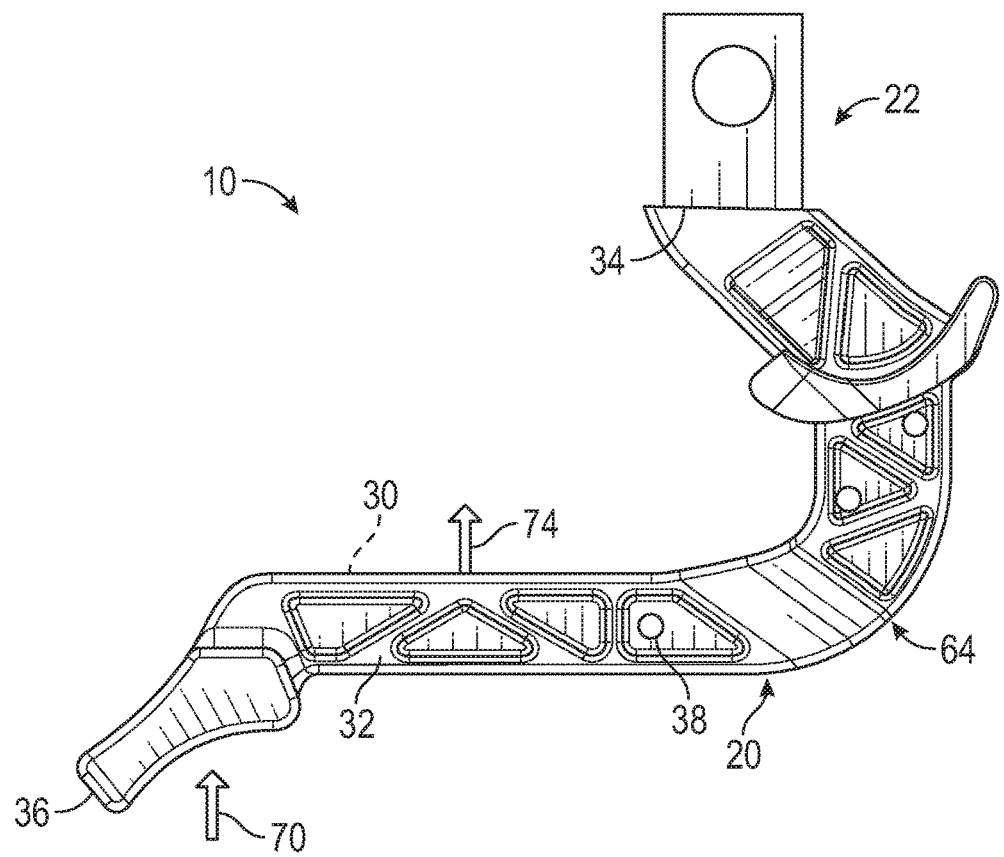
FIG. 1 is a side view of a lever assembly of a steering column assembly.
Figure 2:
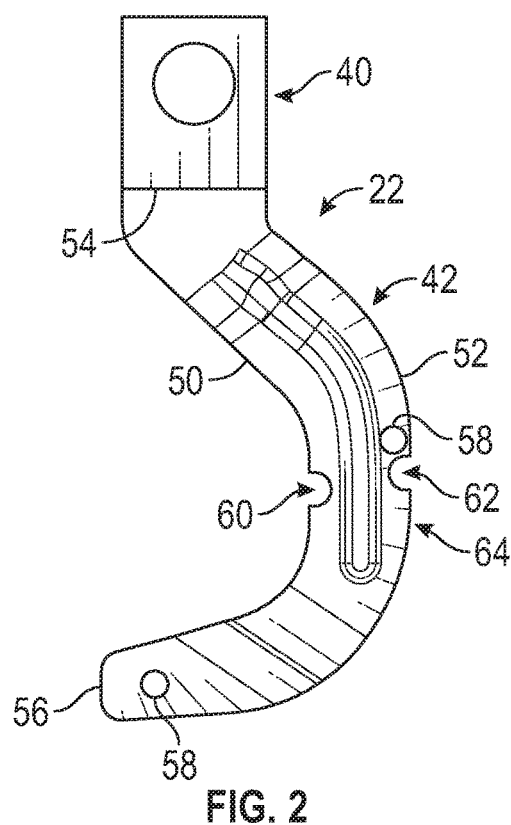
FIG. 2 is a side view of a lever member of the lever assembly.

Referring to FIGS. 1 and 2, a lever assembly 10 that may be provided with an adjustable steering column assembly. The adjustable steering column assembly may be extendable or retractable along a steering column axis and may be pivotable or tiltable about a pivot axis or a tilt axis that is disposed generally transverse to the steering column axis. The lever assembly 10 is movable between a locked position that inhibits the adjustment of the steering column assembly while maintaining a current position of the steering column assembly relative to an operator of the vehicle and an unlocked position that facilitates or permits the adjustment of the steering column assembly relative to the operator of the vehicle.

The lever 20 includes a first lever side 30 and a second lever side 32 that is disposed opposite the first lever side 30. The first lever side 30 and the second lever side 32 each extend between a first lever end 34 and a second lever end 36. The first lever side 30 may be an outer surface of the lever 20 and the second lever side 32 may be an inner surface of the lever 20. In at least one embodiment, the second lever side 32 defines at least one opening 38 that extends from the second lever side 32 towards the first lever side 30. The one opening 38 exposes at least a portion of the lever member 22.

The lever 20 may be a hollow member that defines a receiving region or cavity that extends from the first lever end 34 towards the second lever end 36 and is defined between the first lever side 30 and the second lever side 32. In at least one embodiment, the lever 20 may be a plastic component that is molded over at least a portion of the lever member 22.

The second lever end 36 may at least partially define a handle of the lever assembly 10 upon which an operator of the vehicle may grasp to move the lever assembly 10 between the locked position and the unlocked position.

The lever member 22 is arranged to be at least partially received within the lever 20 or is arranged to abut a side of the lever 20. The lever member 22 may be a stamped metallic component that is at least partially disposed inside the over-molded lever 20. The lever member 22 includes a lever member first portion 40 and a lever member second portion 42 that extends from the lever member first portion 40 and extends into the cavity of the lever 20.

The lever member first portion 40 is operatively connected to the steering column assembly through a locking mechanism. The lever member first portion 40 is operatively connected to or at least partially forms the locking mechanism that selectively inhibits the adjustment of the steering column assembly.

The lever member second portion 42 extends from the lever member first portion 40. The lever member second portion 42 extends into the lever 20. In at least one embodiment, the lever member second portion 42 is disposed against or is arranged to engage the second lever side 32. The lever member second portion 42 extends towards the second lever end 36 of the lever 20.

The lever member second portion 42 includes a first side 50 and a second side 52 that is disposed opposite the first side 50. The first side 50 and the second side 52 each extend between a first end 54 of the lever member second portion 42 and a second end 56 of the lever member second portion 42. The lever member first portion 40 extends from the first end 54 of the lever member second portion 42 in a direction that extends away from the lever 20, such that the lever member first portion 40 is spaced apart from the lever 20. The second end 56 of the lever member second portion 42 is spaced apart from the second lever end 36 of the lever 20 such that an empty space or cavity may be defined between the second end 56 of the lever member 22 and the second lever end 36 of the lever 20.

The lever member second portion 42 may define at least one lever member opening 58. The lever member opening 58 may be disposed proximate the second end 56. The lever member opening 58 may be generally aligned with the opening 38 of the lever 20.

An intermediate portion of the lever member second portion 42 that is disposed between the first end 54 and the second end 56 of the lever member second portion 42 defines a deformation area or a lever bend area 64 such that the second end 56 of the lever member second portion 42 rotates or moves relative to the first end 54 of the lever member second portion 42 to deform the lever member second portion 42 about or due to a predefined plastically deformable stress point to absorb energy or a load imparted to the lever assembly 10 during a vehicle impact event. In at least one embodiment, the deformation area or the lever bend area 64 of the intermediate portion is arranged to facilitate the movement of the lever member second portion 42 relative to the lever member first portion 40 about or due to a predefined plastically deformable stress point to absorb energy or a load imparted to the lever assembly 10 during a vehicle impact event.

The deformation area or lever bend area 64 of the intermediate portion defines a predefined plastically deformable stress point that is at least one of a first notch 60 and/or a second notch 62. At least one of the first notch 60 and/or the second notch 62 enables the second end 56 of the lever member second portion 42 to rotate or move relative to the first end 54 of the lever member second portion 42 about at least one of the first notch 60 and/or the second notch 62.

The first notch 60 extends from the first side 50 of the lever member second portion 42 towards the second side 52 of the lever member second portion 42. The second notch 62 extends from the second side 52 of the lever member second portion 42 towards the first side 50 of the lever member second portion 42. In at least one embodiment, the lever member opening 58 may be disposed proximate the second notch 62.

The size of at least one of the first notch 60 and the second notch 62 may be varied to facilitate deflection of the lever member second portion 42 at various loads. In at least one embodiment, a first width or a first depth of the first notch 60 may be different than a second width or a second depth of the second notch 62. In at least one embodiment, a first width or a first depth of the first notch 60 may be substantially similar to a second width or a second depth of the second notch 62.

The lever member second portion 42 and the second lever end 36 of the lever 20 is arranged to move or deflect relative to the lever member first portion 40 around or about at least one of the first notch 60 and the second notch 62, responsive to a load 70 applied proximate the second lever end 36 of the lever 20 greater than a threshold load. The load 70 may be a load provided as a result of an impact of a body part of an operator, such as a knee or leg, with the lever assembly 10. The first and second notches 60, 62 enable the load 70 to cause the lever member second portion 42 to deflect and/or plastically deform proximate the deformation area or lever bend area 64 relative to the lever member first portion 40. In other words, the deformation area or bend area 64 of the lever member 22 utilizes at least one of the first notch 60 and the second notch 62 to facilitate deflection or deformation of the lever member second portion 42 to absorb energy imparted during a vehicle impact event.

The lever member second portion 42 and the second lever end 36 of the lever 20 may deflect in a first direction 74. The plastic deformation and/or deflection of the lever member second portion 42 allows the lever assembly 10 to absorb energy in a controller manner while maintaining part integrity of the lever assembly 10 to inhibit a portion of the lever 20, e.g. between the second end 56 of the lever member 22 and the second lever end 36 of the lever 20 from fracturing and releasing.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A lever assembly provided with a steering column, comprising:
    a lever having a first lever end and a second lever end, the lever being a plastic, hollow component that defines a receiving cavity; and
    a lever member disposed within the receiving cavity of the lever, the lever member being a metallic component having a lever member first portion connected to the first lever end and a lever member second portion extending from the lever member first portion, the lever member second portion has an intermediate portion defining a predefined plastically deformable stress point that is arranged to facilitate movement of the lever member second portion relative to the lever member first portion, the intermediate portion comprising a bend area, the predefined plastically deformable stress point being a notch located within the bend area, the lever member second portion extending from a first end to a second end, the second end of the lever member second portion spaced from the second lever end of the lever to define an empty space between the second end of the lever member second portion and the lever second end; wherein the lever member first portion protrudes from the first lever end.

2. The lever assembly of claim 1, wherein the lever member second portion has a first side and a second side disposed opposite the first side, the first side and the second side each extend between the first end of the lever member second portion and the second end of the lever member second portion.

3. The lever assembly of claim 2, wherein the lever member first portion extends from the first end of the lever member second portion.

4. The lever assembly of claim 2, wherein the notch extends from the first side towards the second side.

5. The lever assembly of claim 2, wherein the notch extends from the second side towards the first side.

6. The lever assembly of claim 2, wherein the second end of the lever member second portion is arranged to move relative to the first end of the lever member second portion during a vehicle impact event.

\* \* \* \* \*